United States Patent [19]

Hayashi

[11] Patent Number: 4,905,512

[45] Date of Patent: Mar. 6, 1990

[54] METHOD OF CONTINUOUSLY MEASURING A SUCCESSIVELY CONVEYED LENGTHY BODY

[75] Inventor: Torahiko Hayashi, Utsunomiya, Japan

[73] Assignee: Rheon Automatic Machinery Co., Ltd., Tokyo, Japan

[21] Appl. No.: 193,183

[22] Filed: May 6, 1988

Related U.S. Application Data

[63] Continuation-in-part of Ser. No. 771,890, Sep. 3, 1985, abandoned.

[30] Foreign Application Priority Data

Aug. 31, 1984 [JP] Japan .................... 59-183404

[51] Int. Cl.⁴ .................. G01B 11/04; G01B 11/28
[52] U.S. Cl. .................. 73/169; 364/564; 356/380; 356/386
[58] Field of Search .......... 73/169, 227; 33/1 M, 33/1 V, 125 A, 524, 525; 356/379, 380, 386, 387; 364/561–564; 250/235, 560

[56] References Cited

U.S. PATENT DOCUMENTS

| | | | |
|---|---|---|---|
| 3,355,590 | 11/1967 | Bertram | 250/235 |
| 3,436,968 | 4/1969 | Unger et al. | 364/564 |
| 3,588,480 | 6/1971 | Unger et al. | 364/564 |
| 3,819,918 | 6/1974 | Hale | 364/564 |
| 3,983,368 | 9/1976 | Csakvary et al. | 364/564 |
| 4,027,978 | 6/1977 | Yamamoto et al. | 356/387 |
| 4,456,829 | 6/1984 | Fohey | 250/235 |
| 4,490,801 | 12/1984 | Hagan et al. | 364/564 |
| 4,549,272 | 10/1985 | Hagan et al. | 364/564 |
| 4,573,798 | 3/1986 | Fujie et al. | 356/380 |
| 4,693,607 | 9/1987 | Conway | 356/380 |
| 4,749,273 | 6/1988 | Reinhold | 356/379 |
| 4,773,029 | 9/1988 | Claesson et al. | 364/564 |

FOREIGN PATENT DOCUMENTS

| | | | |
|---|---|---|---|
| 0087002 | 7/1980 | Japan | 356/379 |
| 943524 | 7/1982 | U.S.S.R. | 356/379 |
| 795525 | 5/1958 | United Kingdom | 356/386 |
| 1421550 | 1/1976 | United Kingdom | 356/380 |

OTHER PUBLICATIONS

Japaneese Literature; Submitted by Applicant as Art Prior to His Japanese Priority Date 8-31-84.

Primary Examiner—William A. Cuchlinski, Jr.
Assistant Examiner—Patrick R. Scanlon
Attorney, Agent, or Firm—Guy W. Shoup; Paul J. Winters

[57] ABSTRACT

A method of continuously measuring a successively conveyed lengthy body. Light sensors are located above and laterally of the conveying path of a conveyor and measure the distances from the sensors to various points on the surface of the lengthy body while being conveyed. The sectional area of the body is then calculated by a computer, and further the weight of the body is calculated. Various kinds of light sensors are applicable to the method of this invention.

4 Claims, 3 Drawing Sheets

METHOD OF CONTINUOUSLY MEASURING A SUCCESSIVELY CONVEYED LENGTHY BODY

This is a continuation-in-part application from application Serial No. 771,890 filed 09/03/85 now abandoned.

BACKGROUND OF THE PRESENT INVENTION

1. Field of the Invention

The present invention relates to the measurement of the volume or weight of a successively conveyed lengthy body, and particularly to a method of measuring distances from a sensor or sensors to various points on the surface of a successively conveyed lengthy body on a conveyance path and calculating a sectional area thereby obtaining the volume or weight of the body per unit length. The present invention further relates to a method of measuring distances from sensors to the surfaces of the lengthy dough body which is successively conveyed in the production of bread or confectionery products, calculating the sectional area of the body, and then calculating the volume or weight of the body without using any conventional mechanical method.

2. Description of Prior Art

The measurement of the weight of a body which is successively conveyed has conventionally been made by various methods, for instance, a balance method, a spring expansion and compression method, and a strain meter method. Apparatuses using these methods are disposed midway of a conveyor by which a body to be measured is carried, and weight measurements per unit length of the body are integrated to obtain the weight value of the body of a required length.

These mechanical methods have proved to be satisfactory, to a certain extent, when a powdery or granular material is conveyed. However, none of them could attain accurate measurements because the torque in the conveying direction caused by the conveyance of the material influences the measurement of the weight. Further, it is theoretically impossible for these methods to measure a lengthy rigid body.

Japanese Patent Early-Publication (KOKAI TOKKYO KOHO) No. 14128/85 teaches an apparatus for measuring the weight of massive substance, in which an X-ray generator and aligned X-ray linear sensors are oppositely disposed. The massive substance to be measured is moved relative to the X-ray generator and the X-ray linear sensors detect the X-rays transmitted through the massive substance thereby computing the weight of the massive substance. This apparatus is based on a theory that the amount of transmitted X-rays depends on the mass of substance through which X-rays are transmitted, so that rapid and accurate measurement is expected. There is no teaching in this prior art publication that the apparatus can also be used in the measurement of lengthy bodies. Again, a specially designed cover is required to protect the X-ray generator from the leakage of X-rays, and X-ray linear sensors should also be disposed underneath the massive substance in alignment. Furthermore, in view of safety, the apparatus of the prior art is not applicable to the measurement of food, for example, dough or confectionery.

SUMMARY OF THE INVENTION

It is an object of the present invention to provide a method of continuously measuring a successively conveyed lengthy body by providing sensors to measure the distance between the sensors and the surface of the body. It is another object of the present invention to provide a method of continuously measuring a successively conveyed lengthy body by providing sensors above and laterally of the body to accurately measure the distance from the sensors and the surface of the body and calculating the sectional area and in turn the volume and furthermore the weight of the body.

It is still another object of the present invention to provide a method of measuring a successively fed lengthy body, by which a quantitative feeding of, for instance, a pasty product material into a dividing station in the process of making bread or a product to be cooked can be satisfactorily conducted. It is still a further object of the present invention to provide a method of continuously measuring a successively fed lengthy body, by which the weight of a raw material or an elongate solid material is measured and the material is divided into portions of desired weight.

In one aspect of this invention, a method of continuously measuring a successively conveyed lengthy body is provided, which comprises moving a sensor back and forth in a horizontal and transverse direction above the conveying path of a conveyor from one side to the other, operating the sensor to measure the distance from the sensor to various points on the surfaces of a lengthy body while being conveyed on the conveyor, calculating the height of the lengthy body at each point measured, calculating the sectional area of each section of the lengthy body comprising the points measured, and calculating the volume of a fraction of the body by multiplying the sectional area by a predetermined length of the fraction of the body.

In another aspect of this invention, a method of continuously measuring a successively conveyed lengthy body is provided, which comprises operating a plurality of sensors to measure the distances from the sensors to various points on the surfaces of a lengthy body while being conveyed on a conveyor, the plurality of sensors being disposed in a horizontal and transverse direction above the conveying path of the conveyor, calculating the height of the lengthy body at each point measured, calculating the sectional area of each section of the lengthy body comprising the points measured, and calculating the volume of a fraction of the body by multiplying the sectional area by a predetermined length of the fraction of the body.

Various kinds of sensors are applicable to the present invention. For example, an infrared ray sensor composed of an infrared ray generator and an infrared ray sensing element may be utilized. This infrared ray sensor works as a unit, so that it can attain measurement of distances without the help of any other sensing elements. Similarly, by utilizing ultraviolet ray sensors, visible light sensors, or laser beam sensors, which also work as a unit as light or beam generators and light or beam sensing elements, a simple and accurate method of measuring distances between the sensors and the surfaces of the successively conveyed lengthy body is realized.

Thus, according to the present invention, the volume or weight of a lengthy body can be simply and continuously measured with great accuracy regardless of whether the body to be conveyed is a powdery or granular material, whether the body is in the form of a lengthy rigid body such as an elongate pillar, or whether the body is a pasty product such as bread dough or a material to be cooked.

On the basis of the distance information from sensors, a computer may calculate the sectional area of the body and then the volume or the weight of the body per unit length is calculated. The computed values are compared with predetermined control values, and the computer transmits commands, for example, to a dough dividing apparatus and so forth.

In one mode of the invention, a sensor located above the conveying path is adapted to move back and forth in a horizontal and transverse direction above a lengthy body to be measured and emits rays or beams and senses the reflection from the surface of the body. The sensor, thus, detects the distances from the sensor to various points on the body's surface and transmits electric signals as distance information to a computer which then calculates the height of the object, the sectional area of each section of the lengthy body, and the volume of a fraction of the object.

When the lengthy body is thicker and has recess portions in the side walls, no accurate measurement may be obtained, consequently, in each side of the conveying path additional sensors are provided.

Furthermore, a plurality of fixedly disposed sensors may also be utilized in the present invention. These sensors are located in a horizontal and transverse direction above the conveying path to measure the distances in a stationary condition without moving sensors thereby to obtain more accurate measurements.

Since the method of this invention can achieve the measurement of the weight of any lengthy body which is successively conveyed on a conveyor, the method serves as a method of controlling the quantity and quality of products in a mass production process.

DESCRIPTION OF THE PREFERRED EMBODIMENTS

An embodiment of the present invention will now be described with reference to the drawings.

Figure 1:
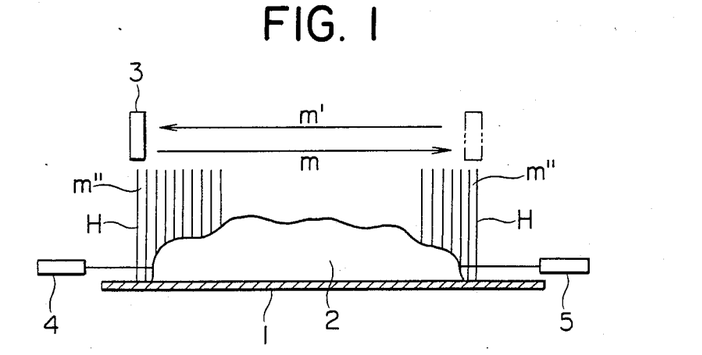
FIGS. 1 and 2 illustrate movement of a sensor (sensors) measuring the distances from the sensor to various points on the surfaces of the lengthy body.

In FIG. 1, dough 2 is conveyed on a conveyor belt 1 above which a sensor 3 is located. The sensor 3 reciprocates in a horizontal direction which is transverse to the conveyance path above the dough 2, and the directions of its movement are shown by the arrows m and m'. The sensor 3 emits light and senses its reflection from portions on the surfaces of the body at each measuring point that is spaced apart from the adjacent points by a certain incremental distance m''. An example of a distance-measuring light sensor, which is commercially available, is sensor PA-1810 made by Lead Electric Co., Ltd., Japan. Typically, the sensor detects the amount of displacement of a light spot on the surface of a body moving at a known velocity to compute the distance of the reflecting surface from the sensor. Ultrasonic sensors which measure distance by the time it takes for sound waves to be reflected back to the sensor are also well known.

The light emitted from the sensor 3 and the reflection from the dough surface are indicated by vertical lines H. The sensor 3 is composed of a light emission element and a reflection sensing element which constitute the sensor working as a unit.

Light emitted from the light emission element reflects at the dough surface, and the reflection is detected by the reflection sensing element. This reflection has distance information responding to the distance from the sensor 3 to the dough surface and is converted into an electric signal.

The sensor 3, while moving reciprocally above the dough 2 which is being conveyed, transmits the electric signal at each measuring point to a computer. The computer, upon receiving the signal, calculates the height of dough at each measuring point and multiplies the value of the dough height by the value of the incremental distance m'' to obtain an incremental area of the dough. The total cross-sectional area is then obtained by totalling all of the incremental areas across the width of the cross-section of the dough, which will be referred to as "sectional area A," when the sensor 3 completes its transverse movement covering the stretch indicated by the arrow m. The computer multiplies the value of the sectional area A by a predetermined length l that corresponds to the distance of the dough conveyed in a unit time interval, to obtain the volume of the relevant portion of the dough and then multiplies the volume of the dough by the specific gravity P of the dough to obtain the weight of the dough per unit length l. The sensor 3 then moves as shown by an arrow m' to the original position, while measuring distances in the same manner as described above. Thus the sectional area of the dough covered by the return stroke of the sensor 3 is obtained, and this area will be referred to as "sectional area B." The sectional area B is then multiplied by l and further multiplied by P to obtain the weight of the dough portion for the succeeding length l. If the weight measurements of the dough portions are expressed as $X_1, X_2 \ldots$, they may be expressed by the following equations:

$$X_1 = A \times l \times P, \quad X_2 = B \times l \times P$$

Figure 2:
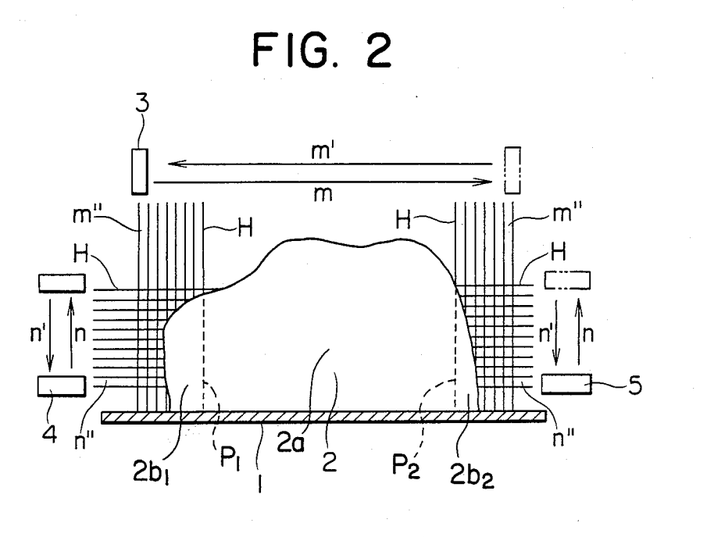

When the dough is high, a pair of sensors (4,5), one provided at each side of the conveyor (1), perpendicularly reciprocate to measure the horizontal distances from the traveling sensors (4,5) to points on the dough surfaces thereby supplementing the distance information with information about each side of the dough body (2). This process is desirable because, if the dough is high, measurement taken by the overhead sensor (3) is liable to be inaccurate. For example, if the dough has a depression on its side, the sensor (3) cannot detect the existence of the depression. Thus the sectional area of the dough calculated should be greater than the accurate sectional area due to the area of the depression. However by using the pair of sensors (4,5), the corrected sectional area of dough is calculated as discussed below.

In this embodiment, the dough is assumed to have three portions, that is, a middle portion ($2a$) defined by two planes ($P_1, P_2$) vertical to and in the longitudinal direction on the conveyor belt (1) and the side portions ($2b_1, 2b_2$) of which are portions of the dough other than the middle portion. The planes ($P_1, P_2$) are spaced apart from the sensors (4,5) by predetermined distances which are used as reference distances for calculating the sectional areas of the side portions ($2b_1,2b_2$) as discussed below. In this embodiment, the planes ($P_1,P_2$) are selected so that most of the dough body (2) can be included between them. The top sensors (3) move at a predetermined height above the conveyance belt (1) across the middle portion (2a) of the dough body (2) and measures the vertical distance to each point on the top surface. Then the sectional area of the middle portion (2a) is calculated as explained above.

While moving the top sensor (3), the pair of side sensors (4,5) move back and forth on both sides of the conveyance path across the heights of the side portions ($2b_1,2b_2$) of the lengthy body (2) as indicated by the arrows n and n' in FIG. 2 and measures the distance from the sensors to each point on the side surfaces of the side portions ($2b_1,2b_2$). Then, the horizontal distances from the vertical planes to each point on both side surfaces of the side portions ($2b_1,2b_2$) of the dough body are calculated by subtracting the measured distance at each point on the side surfaces from the predetermined distance between the respective planes ($P_1,P_2$) and the relevant side sensors (4,5). The sectional areas B of the side portions ($2b_1,2b_2$) are calculated as described above. The total sectional area is then obtained by adding the sectional area of the middle portion (2a) and the sectional areas of the side portions ($2b_1,2b_2$). Finally the volume of the relevant portion of the dough body (2) can be obtained by multiplying the total sectional area by the predetermined length l as explained above. The vertical distance information on the varying top surface of the dough body 2 provided by sensor 3, as described above, is used to obtain the incremental heights across the top surface of the dough, whereas the horizontal distance information provided by sensors 4, 5 reciprocated in directions n and n' is used to obtain the incremental widths over the side surfaces of the dough. Alternatively, arrays of sensors may be used similar to that show in FIG. 5. Then, a more accurate total sectional area is obtained by computation using the incremental heights and the incremental widths measured by the sensors.

Figure 3:
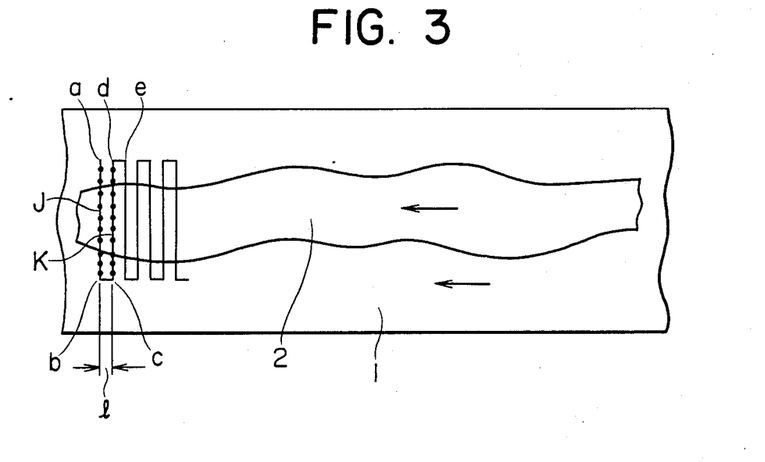
FIGS. 3 and 4 are plan view showing transverse trails of a sensor above the lengthy body.
Figure 4:
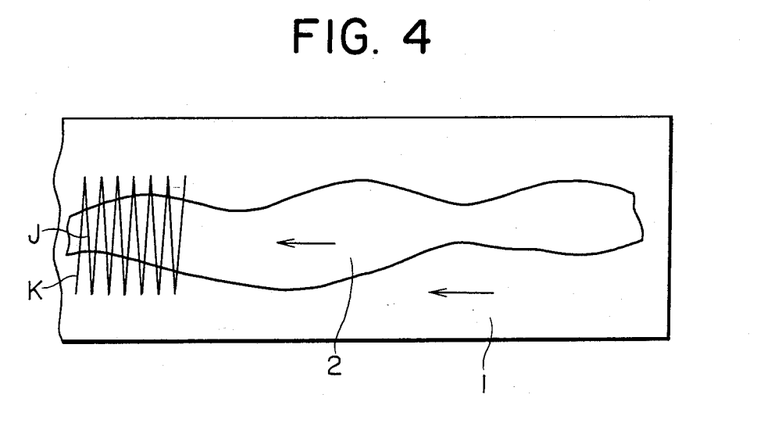
Figure 5:
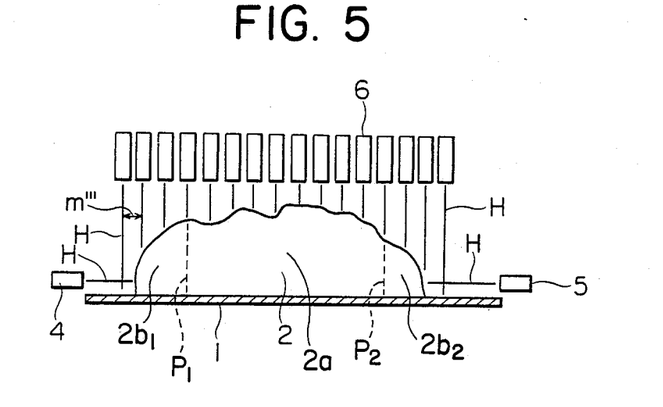
FIG. 5 is a side elevation view showing another embodiment of this invention in which a plurality of aligned sensors are disposed above a successively conveyed lengthy body.

The transverse movement of the overhead sensor 3 is further shown in FIGS. 3 and 4. In these figures, the dough 2 is conveyed by the conveyor belt 1, and the tails of the sensor 3 are shown by the lines J and K. In FIG. 3, the speed of the sensor 3 relative to the speed of the dough is much higher than the case of FIG. 4, and the halt time at each side of the dough is longer. Thus, the halt time substantially corresponds to the distance l. The trail of the sensor 3 is made by its reciprocative movement, which begins at a point a and continues through points b, c, d, e ... Points on the lines J and K are those where the sensor 3 takes measurement. When the relative speed of the sensor 3 is lower and the halt time is very short, the trail may be as shown in FIG. 4. In this case, measurements must be adjusted accordingly. Another embodiment of this invention is shown in FIG. 5, in which instead of the traveling sensor (2) in FIG. 2, a plurality of aligned sensors (6) are provided horizontally above the conveyor belt (1) in a direction transverse to the conveyance path of the conveyor belt (1), each being spaced apart from the adjacent ones by a short distance m'''. As shown in FIG. 5, the pair of side sensors (4,5) are provided and obtain information about the horizontal distances to the respective points on both side surfaces of the side portions ($2b_1,2b_2$).

Figure 6:
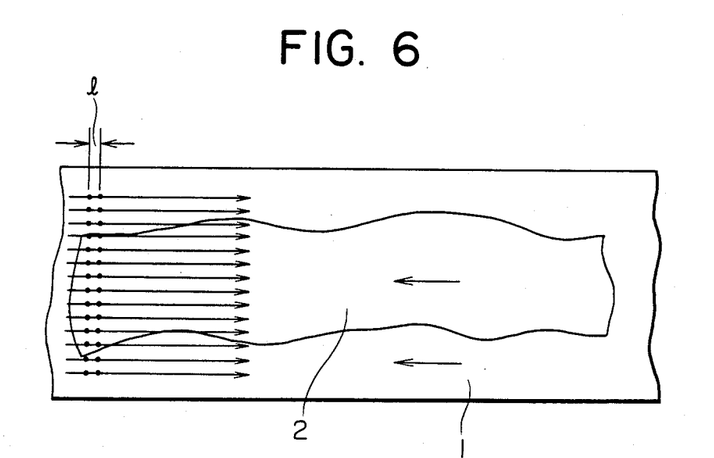
FIG. 6 is a plan view of the embodiment of FIG. 5, showing two rows of measuring points spaced apart by a distance at which points sensors measure the distance from them to the lengthy body.

Thus, by adding the sectional areas of the middle and side portions ($2a, 2b_1,2b_2$) described above, the more accurate calculation is attained in this embodiment. The pair of sensors (4,5) can be replaced with a pair of sensor arrays, one on each side of the conveyor belt (1). A plurality of measuring points for this embodiment are shown in FIG. 6. As will be seen in the drawing, measurement is conducted at each time when the dough moves a distance l, and the computer calculates the dough weight in the similar manner as mentioned in the preceding embodiments. In either embodiment, the shorter the length l, the greater the accuracy of measurement of the present invention.

As described above, the present invention does not use any mechanical measurement. Therefore, various accidents attributable to external causes can be prevented. In using the mechanical measurement, if, for instance, a balance is disposed beneath the conveyor belt to mechanically measure the weight of dough 2 conveyed by the belt, the tension of the belt tends to disturb the measurement of the weight of the dough 2, and no accurate weight measurement can be obtained. According to the present invention, the sectional area of dough being successively conveyed can be continuously measured by the sensor to continuously measure the volume and weight of each of very minute portions of the dough, so that the weight of a specified length of the dough can be easily computed by integration. According to the present invention, no particular device, such as the X-ray protector or X-ray sensing elements are required.

Although the embodiments of this invention have principally referred to the measurement of the volume or weight of dough, this invention is in no way limited to the measurement of dough and can also be utilized for the measurement of a plastic material, a viscoelastic material and a rigid lengthy material.

I claim:

1. A method of continuously measuring the volume of a successively conveyed lengthy body conveyed in a longitudinal direction on a conveyance path, the lengthy body having a surface defining a multitude of surface points, a varying width in a direction transverse to the conveyance path and a varying height in a vertical direction above the conveyance path, the lengthy body further having a middle portion defined between two predetermined vertical planes disposed vertical to and in a longitudinal direction on the conveyance path and portions other than the middle portion on both sides thereof, comprising the steps of:

(a) providing a top sensor at a predetermined reference height above the conveyance path and a pair of side sensors, one on each side of the conveyance path, at a predetermined reference distance from said vertical planes, the side sensors spaced apart from each other by a distance sufficient to permit the lengthy body to pass therebetween, the top and side sensors being of the distance measuring type having a signal emitting portion and a reflected signal detecting portion and a means for measuring the distance from each sensor to a respective surface point on a detected body through detection of the respective reflected signals;

(b) moving the top sensor back and forth in the transverse direction at the reference height above the conveyance path across the middle portion of the lengthy body at successive incremental longitudinal positions in successive transverse passes from one side of the lengthy body to the other, while moving the pair of side sensors back and forth in the vertical direction on both sides of the conveyance path across the heights of the portions of the lengthy body other than the middle portion, at successive incremental longitudinal positions in successive vertical passes from the top or bottom to the bottom or top of said portions of the lengthy body, said successive transverse and vertical passes being synchronized such that said top and side sensors obtain measurements from substantially the same incremental longitudinal positions, thereby defining an incremental longitudinal length with which to compute an incremental volume of said lengthy body;

(c) operating the top sensor to measure the vertical distances from the top sensor to the respective surface points across the middle portion of the lengthy body being conveyed on the conveyor, while operating the pair of the side sensors to measure the horizontal distances from the side sensors to each of the surface points across the portions of the lengthy body other than the middle portion conveyed on the conveyance path at successive incremental longitudinal positions of the top and side sensors relative to the lengthy body;

(d) calculating the heights above the conveyance path of each of the surface points in each pass across the surface of the middle portion of the lengthy body on the basis of the reference height of the sensor and the measured vertical distance from the top sensor to each of the surface points;

(e) calculating the horizontal distances from the respective vertical planes defining the middle portion to each of the surface points in each pass across the surfaces of said portions of the lengthy body on the basis of the horizontal distances from the side sensors to each of the surface points;

(f) calculating a sectional area of the middle portion of the lengthy body at each incremental longitudinal position in each pass bounded by the conveyance path and the measured surface points on the lengthy body;

(g) calculating sectional areas of the portions of the lengthy body other than the middle portions, at each incremental longitudinal position in each pass of the side sensors, bounded by said vertical planes and the measured surface points on the lengthy body;

(h) calculating the total sectional areas of the lengthy body in each pass of the top sensor and the side sensors, by adding the sectional area of the middle portion and the sectional areas of the portions other than the middle portions; and (i) calculating an incremental volume of the lengthy body by multiplying the total sectional area in each pass of the top sensor and the side sensors by a predetermined incremental length of the lengthy body for each incremental longitudinal position.

2. A method of continuously measuring the volume of a successively conveyed lengthy body conveyed in a longitudinal direction on a conveyance path, the lengthy body having a surface defining a multitude of surface points, varying width in a direction transverse to the conveyance path and a varying height in a vertical direction above the conveyance path, the lengthy body further having a middle portion defined between two predetermined vertical planes disposed vertical to and in a longitudinal direction on the conveyance path and portions other than the middle portion on both sides thereof, comprising the steps of:

(a) providing a plurality of top sensors spaced incrementally in an array extending in the transverse direction at a predetermined reference height across the conveyance path, and a pair of side sensors, one on each side of the conveyance path, at a predetermined reference distance from said vertical planes, the side sensors spaced apart from each other by a distance sufficient to permit the lengthy body to pass therebetween, the top and side sensors being of the distance measuring type having a signal emitting portion and a reflected signal detecting portion and means for measuring the distance from each sensor to a respective surface point on a detected body through detection of the respective reflected signals;

(b) moving the pair of side sensors up and down in the vertical direction on both sides of the conveyance path across the heights of the portions of the lengthy body other than said middle portion, at successive incremental longtiudinal positions in successive vertical passes from the top or bottom to the bottom or top of said portions of the lengthy body;

(c) operating the array of the top sensor to measure the vertical distances from the top sensors to the respective surface points across the middle portion of the lengthy body being conveyed on the conveyance path at successive incremental longitudinal positions of the sensor array relative to the lengthy body, said incremental longitudinal positions corresponding to said incremental longitudinal positions at which said side sensors pass from the top or bottom to the bottom or top of said portions of the lengthy body other than the middle portion while operating the pair of the side sensors to measure the horizontal distance from the sensors to each of the surface points across the portions of the lengthy body other than the middle portion conveyed on the conveyance path such that said sensor array and side sensors obtain measurements from substantially the same incremental longitudinal positions, thereby defining a longitudinal length with which to compute an incremental volume of said lengthy body;

(d) calculating the heights above the conveyance path of each of the surface points across the surface of the middle portion of the lengthy body on the basis of the reference height of the top sensors and the measured vertical distance from the top sensors to the respective surface points at each incremental longitudinal position;

(e) calculating the horizontal distances from the respective vertical planes defining the middle portion to reach of the surface points in each pass across the surfaces of said portions of the lengthy body on the basis of the horizontal distances from the side sensors to said vertical planes and the measured horizontal distances from the side sensors to each of the surface points;

(f) calculating a sectional area of the middle portion of the lengthy body at each incremental longitudinal position bounded by the conveyance path and the measured surface points on said portions of the lengthy body;

(g) calculating sectional areas of the portions of the lengthy body other than the middle portion, at each incremental longitudinal position in each pass of the side sensors, bounded by said vertical planes and the measured surface points on the lengthy body;

(h) calculating the total sectional area of the lengthy body by adding the sectional area of the middle portion of the lengthy body at each incremental longitudinal position and the sectional areas of the portions other than the middle portion at each incremental longitudinal position in each corresponding pass of the side sensors; and (i) calculating an incremental volume of the lengthy body by multiplying the total sectional area by a predetermined incremental length of the lengthy body for each incremental longitudinal position.

3. A method of continuously measuring the volume of a successively conveyed lengthy body conveyed in a longitudinal direction on a conveyance path, the lengthy body having a surface defining a multitude of surface points, a varying width in a direction transverse to the conveyance path and a varying height in a vertical direction above the conveyance path, the lengthy body further having a middle portion defined between two predetermined vertical planes disposed vertical to and in a longitudinal directional on the conveyance path and portions other than the middle portion on both sides thereof, comprising the steps of:

(a) providing a plurality of top sensors spaced incrementally in an array extending in the transverse direction at a predetermined reference height across the conveyance path, and a pair of sensor arrays including a plurality of side sensors spaced incrementally in an array extending in the vertical direction, one sensor array on each side of the conveyance path, at a predetermined reference distance from said vertical planes, the side sensors spaced apart from each other by a distance sufficient to permit the lengthy body to pass therebetween, the top and side sensors being of the distance measuring type having a signal emitting portion and a reflected signal detecting portion and means for measuring the distance from each sensor to a respective surface points on a detected body through detection of the respective reflected signals;

(b) operating the array of the top sensors to measure the vertical distance from the sensors to the respective surface points across the middle portion of the lengthy body being conveyed on the conveyance path at successive incremental longitudinal positions of the top sensor array relative to the lengthy body, while operating the pair of the arrays of the side sensors to measure the horizontal distances from the side sensors to the respective surface points across the portions of th lengthy body other than the middle portion conveyed on the conveyance path at successive incremental longitudinal positions of the side sensor arrays relative to the lengthy body;

(c) calculating the heights above the conveyance path of each of the surface points across the middle portion of the lengthy body on the basis of the reference height of the top sensors and the measured vertical distance from the respective top sensors to the respective surface points at each incremental longitudinal position;

(d) calculating the horizontal distances from the respective vertical planes defining the middle portion to each of the surface points across the portions of the lengthy body other than the middle portion on the basis of the horizontal distances from the side sensors to said vertical planes and the measured horizontal distances from the side sensors to each of the surface points;

(e) calculating a sectional area of the middle portion of the lengthy body at each incremental longitudinal position bounded by the conveyance path and the measured surface points on the lengthy body;

(f) calculating sectional areas of the portions of the lengthy body other than the middle portion, at each incremental longitudinal position bounded by said vertical planes and the measured surface points on said portions of the lengthy body other than the middle portion body;

(g) calculating the total sectional area of the lengthy body by adding the sectional area of the middle portion and the sectional areas of the portions other than the middle portion, at each incremental longitudinal position; and (h) calculating an incremental volume of the lengthy body by multiplying the total sectional area by a predetermined incremental length of the lengthy body for each incremental longitudinal position.

4. A method of continuously measuring the volume of a successively conveyed lengthy body conveyed in a longitudinal direction on a conveyance path, the lengthy body having a surface defining a multitude of surface points, a varying width in a direction transverse to the conveyance path and a varying height in a vertical direction above the conveyance path, the lengthy body further having a middle portion defined between two predetermined vertical planes disposed vertical to an in a longitudinal direction on the conveyance path and portions other than the middle portion on both sides thereof, comprising the steps of:

(a) providing a top sensor at a predetermined reference height above the conveyance path and a pair of sensor arrays including a plurality of side sensors spaced incrementally in an array extending in the vertical direction, one sensor array on each side of the conveyance path, at a predetermined reference distance from said vertical planes, the side sensors spaced apart from each other by a distance sufficient to permit the lengthy body to pass therebetween, the top sensor and the side sensors being of the distance measuring type having a signal emitting portion and a reflected signal detecting portion and means for measuring the distance from each sensor to a respective surface point on a detected body through detection of the respective reflected signals;

(b) moving the top sensor back and forth in the transverse direction at the reference height above the conveyance path across the middle portion of the lengthy body at successive incremental longitudinal positions in successive passes from one side of the lengthy body to the other;

(c) operating the top sensor to measure the vertical distances from the top sensor to the respective surface points across the middle portion of the lengthy body being conveyed on the conveyor, while operating the pair of the arrays of the side sensors to measure the horizontal distances from the side sensors to each of the surface points across the portions of the lengthy body other than the middle portion conveyed on the conveyance path at successive incremental longitudinal positions of the sensor arrays relative to the lengthy body;

(d) calculating the heights above the conveyance path of each of the surface points in each pass across the surface of the middle portion of the lengthy body on the basis of the reference height of the sensor and the measured vertical distance from the sensor to each of the surface points;

(e) calculating the horizontal distances from the respective vertical planes defining the middle portion to each of the surface points in each pass across the surfaces of said portions of the lengthy body on the basis of the horizontal distances from the side sensors to said vertical planes and the measured horizontal distances from the side sensors to each of the surface points;

(f) calculating a sectional area of the middle portion of the lengthy body at each incremental longitudinal position in each pass bounded by the conveyance path and the measured surface points on the lengthy body;

(g) calculating sectional areas of the portions of the lengthy body other than the middle portion, at each incremental longitudinal position bounded by said vertical planes and the measured surface points on said portions of the lengthy body other than the middle portion (h) calculating the total sectional area of the lengthy body by adding the sectional area of the middle portion in each pass of the top sensor and the sectional areas of the portions other than the middle portion at each corresponding incremental longitudinal position of the side sensors; and (i) calculating an incremental volume of the lengthy body by multiplying the total sectional area by a predetermined incremental length of the lengthy body for each incremental longitudinal position.

* * * * *

UNITED STATES PATENT AND TRADEMARK OFFICE
CERTIFICATE OF CORRECTION

PATENT NO. : 4,905,512
DATED : March 6, 1990
INVENTOR(S) : Torahiko Hayashi

It is certified that error appears in the above-identified patent and that said Letters Patent is hereby corrected as shown below:

Col. 3 Line 62 through Col. 4 Line 3

"An example of a... well known." should be deleted

Col. 5 Line 47

"tails" should read --trails--

Col. 5 Line 59

"Another embodiment..." should start a new paragraph.

Col. 8, Line 28

"sensor" should read --sensors--

Assignee: Rheon Automatic Machinery Co., Ltd., address should be --Utsunomiya-- not Tokyo.

Signed and Sealed this

Thirtieth Day of July, 1991

Attest:

HARRY F. MANBECK, JR.

Attesting Officer

Commissioner of Patents and Trademarks